PFLEGHAR & SCHOLLHORN.

2 Sheets—Sheet 1.

Machine for Finishing Nuts.

No. 2,008.

Reissued June 20, 1865.

Witnesses.

C. Smith

Edward S. Knight.

Inventors.

F. Pflegar

Jno. Schollhorn

By Munn & Co

Attorneys

PFLEGHAR & SCHOLLHORN.

2 Sheets—Sheet 2.

Machine for Finishing Nuts.

No. 2,008.

Reissued June 20, 1865.

Witnesses.

A. L. Topliff

Henry Morris

Inventors.

P. P. Pfleghar

William Schollhorn

Joseph Morris & Co

Attorneys.

UNITED STATES PATENT OFFICE.

FRANK P. PFLEGHAR AND WILLIAM SCHOLLHORN, OF NEW HAVEN, CONNECTICUT.

MACHINE FOR FINISHING NUTS.

Specification forming part of Letters Patent No. 44,818, dated October 25, 1864; Reissue No. 2,008, dated June 20, 1865.

*To all whom it may concern:*

Be it known that we, FRANK P. PFLEGHAR and WILLIAM SCHOLLHORN, of New Haven, in the county of New Haven and State of Connecticut, have invented a new and Improved Machine for Finishing Nuts; and we do hereby declare the following to be a full, clear, and exact description of the construction and operation of the same, when taken in connection with the accompanying drawings and the letters of reference marked thereon, and which said drawings constitute part of this specification, and represent, in—

Figure 2:
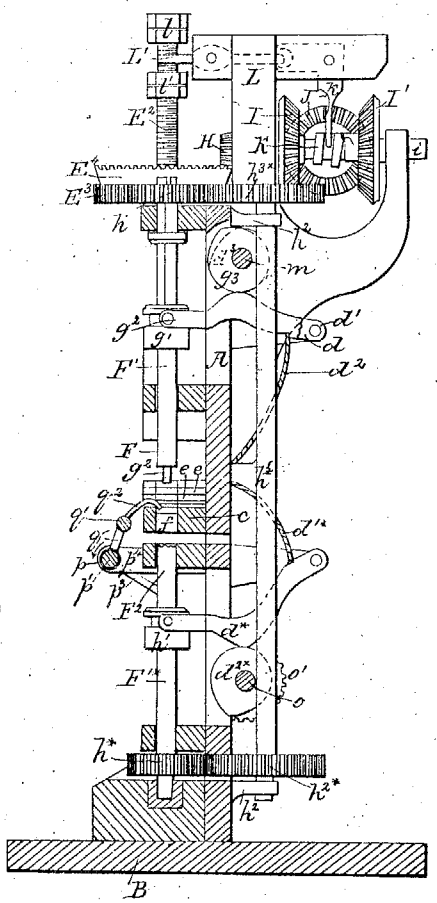
Figure 1:
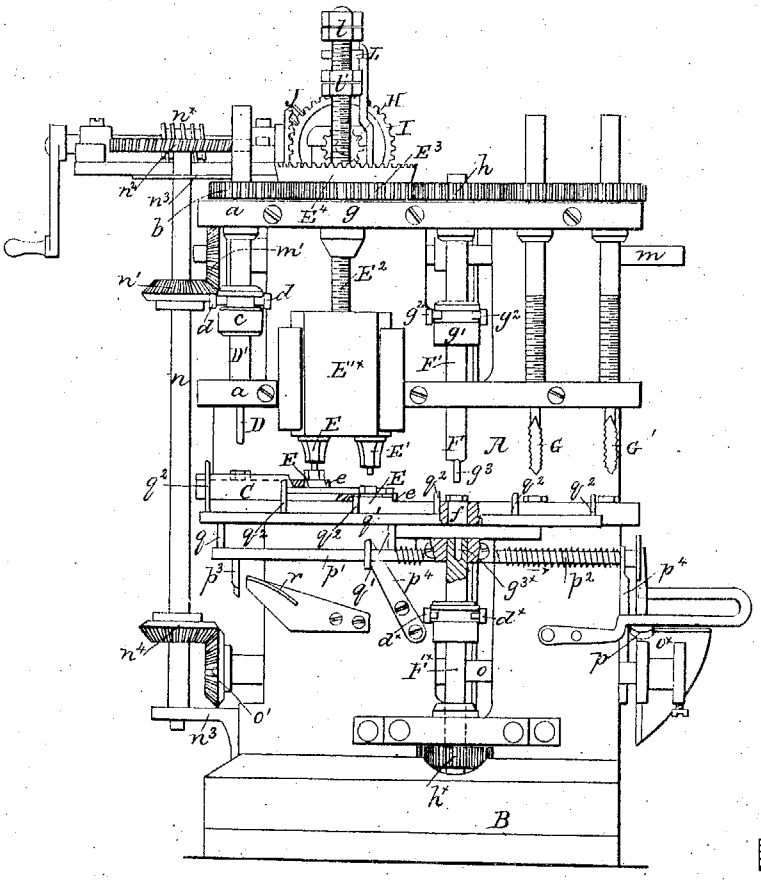
Figure 4:
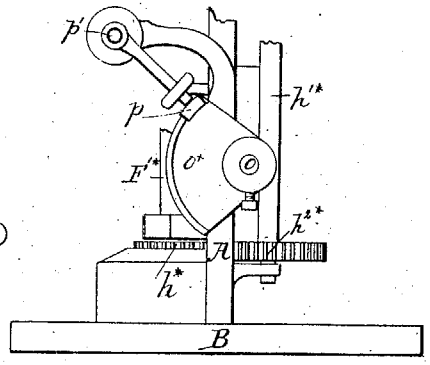
Figure 3:
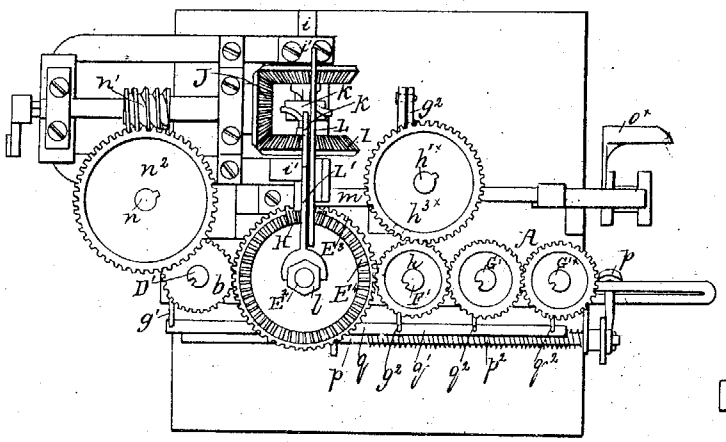

Figure 1, a sectional front elevation; Fig. 2, a transverse vertical section of the same; Fig. 3, a plan or top view, and in Fig. 4 a partial end elevation.

Similar letters of reference indicate like parts.

The object of our invention is to finish machine-nuts; and it consists in an automatic mechanism which receives the blanks as they come from the forge, the nut-machine, or otherwise, and, passing them through the machine, they are finished upon all sides and tapped, and, thus completed, pass from the machine.

The various working parts of our machine and its entire mechanism are secured to a frame, A, which consists of a stout, broad, upright standard, rising from the bed-plate B. Secured to the front side of the frame A is the channel C, which receives the nuts, and in which the same are exposed successively to the action of the reamer D, then to that of the punches E E*, then to that of the scrapers or milling-tools F F*, and finally to that of the taps G G*. The reamer D is secured in a vertical spindle, D′, which has its bearings in suitable journal-boxes, *a*, secured at the proper distance apart on the front side of the frame A, and it is rotated by the action of a cog-wheel, *b*, which connects with the said spindle in such a manner that they are compelled to rotate simultaneously in either direction, but the spindle is free to move in a vertical direction independent of the wheel. Said spindle is provided with a grooved collar, *c*, to receive the forked end of a lever, *d*, which has its fulcrum on a pivot, *d′*, inserted in an arm or bracket which is secured to the rear surface of the frame A. A spring, $d^2$, bearing on the under edge of the lever *d*, keeps the same in contact with the surface of a cam, *d*, so that by the action of the cam the spindle D′ is gradually depressed and afterward gradually raised by the action of the spring, and if a nut has been previously adjusted under the reamer the hole in said nut is reamed out and the reamer withdrawn entirely by the action of the machine. After the hole in the nut has been reamed out to the proper size by the action of the reamer, the nut is pushed along in the channel and placed under the punch E. A cylindrical stud projecting from the under surface of the punch enters the hole of the nut, and brings the same in a central position over the die E′, and when the punch descends the nut is forced through said die and its sides are shaved off and rendered smooth and uniform. After passing through the first die, the nut is pushed along in the channel C, and deposited over the die E′* and under the punch E*, which are formed precisely like the die E′ and punch E, but somewhat smaller than the former, so that by forcing the nut through this second die a final finish is given to the sides of the nut. A single die may answer the purpose; but we prefer to do the work by two or more.

In order to obtain room for the dies E′ E′*, it is necessary to make two steps *e*, in the channel C, and the die E′ is arranged in the first, and the die E′* in the second step, as clearly shown in Fig. 1 of the drawings.

After passing through the second die, the nut is moved along over the hole *f*, which is large enough to take the nut, but so shaped that said nut is not allowed to turn in it. This hole is situated between two milling-tools, F F*, which are arranged as follows: The milling-surface of the tool F is formed by teeth cut in the end of a spindle, F′, which is rotated by the action of a cog-wheel, *h*, and otherwise constructed precisely like the spindle D′ of the reamer D. It is provided with a grooved collar, *g′*, and the forked end of the lever $g^2$ catches into this collar and raises and depresses the tool by the action of a suitable cam and spring on said lever. The tool F* is formed by teeth cut in the top surface of the spindle F'* which is situated below the hole $f$ and in line with the spindle F'. Rotary motion is imparted to the spindle F'* by a cog-wheel, $h^*$, and it is raised and depressed by the action of a forked lever, $d^*$, which catches in a grooved collar, $h'$, on the spindle, and which is subjected to the action of a spring, $d'^*$, and cam, $d^{2*}$, as clearly shown in Fig. 2 of the drawings.

By the action of the levers $g^2$ and $d$ the tools F F* close up, and a cylindrical projection, $g^3$, on the tool F passes through the hole in the nut and into a corresponding cavity, $g^{3*}$, in the tool F* to keep said tools steady during the operation of milling.

By the action of the milling-tools F F* the upper and lower surfaces of the nut are shaved off, and after this operation is finished the nut is pushed along in the channel C and brought under the first tap, G, which is secured in a spindle, G', similar in every respect to the spindle D' of the reamer, and rotated by suitable gear-wheels in the proper direction. For the purpose of depressing this spindle a lever may be used similar to that used for depressing the spindle D'; or it may be provided with a screw-thread which will feed it down, as shown, on the spindle G'* of the second tap G*.

The first tap is tapering and cuts the thread in the nut accordingly, but the second tap is straight and finishes the thread in the nut. This second tap is brought into action after the nut has been tapped with the first tap, and shifted along in the channel to the proper position under said second tap. After the second tap, G*, has acted upon the nut and released the same, said nut is finished and it is pushed out of the channel C into a suitable receptacle ready for immediate use.

The thread may be cut by a single straight tap with tapering point; but we prefer to use two taps, as shown.

It remains to describe the manner in which the various parts of our machine are geared together, and in which the motion of the several tools is reversed and the nut shifted from one tool to the next.

The punchers E E* are secured in the under surface of a carriage, E'*, which moves up and down in suitable guideways secured to the front side of the frame A. From this carriage rises a screw-spindle, $E^2$, which is secured to the same so that it is free to revolve independent thereof, but that when the spindle rises and falls the carriage is compelled to move with it. Said screw-spindle is tapped into the hub of a cog-wheel, $E^3$, and this hub is confined in a suitable journal-box secured to the frame A, so that the wheel $E^3$ is allowed to revolve freely in either direction, without, however, being able to move in the direction of the axis of the screw-spindle.

A bevel-wheel, $E^4$, which is rigidly attached to or cast solid with the cog-wheel $E^3$, gears in a pinion, H, on the clutch-shaft $i$, which has its bearings in journal-boxes $i'$ on an arm extending back from the frame A, as clearly shown in Fig. 2 of the drawings. On this shaft run loosely two bevel-wheels, I I', which gear both in a bevel-wheel, J, on the end of the driving-shaft $j$, and the hubs of the bevel-wheels I I' are provided with teeth to engage with corresponding teeth of the clutch K. This clutch slides on the shaft $i$, and it is operated by an elbow-lever, $k$, which throws the same in gear with either of the bevel-wheels I I'. The elbow-lever is pivoted to a bracket, L, extending over the bevel-wheels I I', and its horizontal arm engages with one end of the switch-lever L', the other forked end of which embraces the screw-spindle $E^2$ between two shoulders or projections, $l$ $l'$. Those shoulders are formed by nuts or in any other suitable manner, and they are placed far enough apart so that the screw-spindle rises and falls the requisite distance before the motion is changed. By diminishing the space between the shoulders $l$ $l'$ the stroke of the carriage is shortened, and vice versa, and the motion of the whole machine is reversed by the action of the clutch-lever.

We do not wish to confine ourselves, however, to the precise mechanism hereinbefore described for the purpose of reversing the motion, and we reserve the right to move the clutch by any other suitable mechanism, such as a cam and lever, or to use in place of the clutch and bevel wheels I I' other means, such as two fast and two loose pulleys similar to those generally used for the purpose of reversing the motion of a planing-machine at given intervals. The cog-wheel $E^3$ gears in the cog-wheels $b$ and $h$, which impart motion to the reamer D and milling-tool F, and through the wheel $h$ the motion is transmitted to the milling-tool F* and to the taps G G*. The wheel $h$ on the top end of the spindle of the milling-tool F gears in a cog-wheel, $h^{3*}$, mounted on the upper end of a vertical shaft, $h'^*$, which has its bearings in arms $h^2$, projecting from the rear surface of the frame A, and which bears near its lower end a cog-wheel, $h^{2*}$, to gear in another cog-wheel, $h^*$, on the lower end of the spindle of the milling-tool F*, as clearly shown in Fig. 2 of the drawings. By this arrangement the rotary motion of the two milling-tools is rendered uniform in either direction.

The cams $d^3$ and $g^3$ are mounted on a horizontal shaft, $m$, which has its bearings in suitable journal-boxes on the rear side of the frame A, and to which motion is imparted by bevel-gear $m'$ $n'$, as clearly shown in Fig. 1 of the drawing. The bevel-wheel $n'$ is secured to a vertical shaft, $n$, to which a slow rotary motion is imparted by the action of an endless screw, $n^*$, on the driving-shaft gearing in a worm-wheel, $n^2$, which is mounted on the top end of the shaft $n$. This shaft has its bearings in arms $n^3$, which extend from the end of the frame A, and a bevel-wheel, $n^4$, mounted on its lower part, gears in a similar bevel-wheel, $o'$, on the horizontal shaft $o$, which bears the cam $d^{2*}$, through the action of which the lower milling-tool, F*, is raised, as previously described.

A second cam, $o^*$, which is mounted on the extreme end of the shaft $o$, acts upon a friction-roller, $p$, on the end of an arm, which extends from the sliding rod $p'$, and by the action of the cam said rod is moved against the spring $p^2$ in the direction of the arrow marked thereon in Fig. 1. Said spring is wound round the rod $p'$, and connected to it in such a manner that it forces the same back to its original position as soon as it is released from the cam $o^*$.

The rod $p'$ has its bearings in arms, $p^4$, extending from the frame A, and is connected by studs $q$ to the rod $q'$, which carries the fingers $q^2$. These fingers extend into the channel C, and serve to push the nuts to be finished from one tool to the other.

In order to prevent the fingers from passing over the nuts in pushing the same forward in the channel, an arm, $p^3$, extends from the sliding rod $p'$, and as this rod moves forward in the direction of the arrow marked thereon in Fig. 1, said arm passes under an inclined plane, $r$, which is secured to the frame A. Said inclined plane is made of thin sheet metal and elastic, so that when the arm $p^3$ passes forward the point of the inclined plane is forced up, and as said arm passes beyond the point of the inclined plane, the point springs back to its original position and the arm in going back strikes the inclined plane above its point and is compelled to pass up over its upper surface in order to clear it. During this motion, the arm, being raised, turns the rod in the direction of the arrow marked thereon in Fig. 2, and the fingers $q^2$ are thrown back so that they clear the nuts in the channel and catch behind the same, ready for a new move.

It must be remarked, however, that this oscillating motion of the fingers is not absolutely necessary for the success of the operation, for the finger bar might be so situated in relation to the channel C that a simple reciprocating motion imparted to it would be sufficient to enable the fingers to clear the nuts in going back.

Although we have described our machine as, first, reaming; second, finishing the sides; third, milling the upper and lower surface, and, lastly, tapping, and believe this to be the best arrangement; yet the operations may be changed by changing the position of the different tools.

We do not wish to confine ourselves, therefore, to the precise mechanism shown in the drawing, but reserve the right to make such changes therein as may be requisite to produce the same or a similar result.

By a machine of this construction, square, hexagonal, or octagonal nuts can be finished upon the sides and ends or upper and lower surfaces without requiring any other attention except to feed in the nuts at the proper intervals, and, if desired, the labor of feeding in the nuts might also be accomplished by suitable mechanism.

Having thus described our invention, we claim as new and desire to secure by Letters Patent—

1. The combination of reamer D, punch or punches E, milling-tool F, and tap or taps G, constructed to operate substantially as specified, whether arranged in the order described or not, when the said combination exists in an organized machine, which, receiving a blank metal nut, finishes it complete while passing through the said organized machine.

2. The use of milling-tools F F*, arranged substantially as herein specified, for the purpose of finishing the faces of a nut.

3. The steps $e$ in the channel C, arranged substantially as and for the purpose set forth.

4. The reversing-gear I, I', J, clutch K, and switch-lever L', or their equivalent arrangement, in combination with the wheels $b$ $E^3$ $h$, which impart motion to the various tools, in the manner and for the purpose substantially as herein specified.

5. The adjustable shoulders $l$ $l'$, applied in combination with the switch-lever L' and with the reversing-gear, substantially as and for the purpose herein described.

6. The automatically-reciprocating rod $p'$ and finger-bar $q'$, applied in combination with the channel C and tools D E E* F F* G G*, in the manner and for the purpose substantially as described.

7. The arm $p^3$ and inclined plane $r$, in combination with the reciprocating rod $p'$, finger-bar $q'$, and channel C, constructed and operating substantially as and for the purpose set forth.

F. P. PFLEGHAR.
WM. SCHOLLHORN.

Witnesses:
JOHN E. EARLE,
WILSON H. CLARK.